US012082052B2

(12) United States Patent
Takeda et al.

(10) Patent No.: US 12,082,052 B2
(45) Date of Patent: Sep. 3, 2024

(54) COMMUNICATION DEVICE AND METHOD FOR MOBILE COMMUNICATION BASED ON QUALITY OF SERVICE (QOS) CONTROL

(71) Applicant: NTT DOCOMO, INC., Tokyo (JP)

(72) Inventors: Daiki Takeda, Tokyo (JP); Yuichi Kakishima, Tokyo (JP); Koji Hiratsuka, Tokyo (JP); Hiroki Ishizuka, Tokyo (JP); Akio Gouda, Tokyo (JP); Masashi Anzawa, Tokyo (JP); Kouta Oguni, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 346 days.

(21) Appl. No.: 17/619,148

(22) PCT Filed: May 27, 2020

(86) PCT No.: PCT/JP2020/021007
§ 371 (c)(1),
(2) Date: Dec. 14, 2021

(87) PCT Pub. No.: WO2020/255657
PCT Pub. Date: Dec. 24, 2020

(65) Prior Publication Data
US 2022/0361045 A1  Nov. 10, 2022

(30) Foreign Application Priority Data
Jun. 17, 2019 (JP) .................. 2019-112297

(51) Int. Cl.
*H04W 28/24* (2009.01)
(52) U.S. Cl.
CPC .................. *H04W 28/24* (2013.01)

(58) Field of Classification Search
CPC ............ H04W 28/24; H04W 28/0236; H04W 28/0268; H04L 41/0893; H04L 41/0894;
(Continued)

(56) References Cited

U.S. PATENT DOCUMENTS

2012/0093019 A1   4/2012 Zhang et al.
2015/0189539 A1*  7/2015 Li ...................... H04L 41/0893
                                                   370/230
(Continued)

FOREIGN PATENT DOCUMENTS

JP   2010-166243 A   7/2010
WO   2019/081026 A1  5/2019

OTHER PUBLICATIONS

Notice of Reasons for Refusal issued in Japanese Application No. 2021-527514 mailed on Nov. 15, 2022 (6 pages).
(Continued)

*Primary Examiner* — Rushil P. Sampat
(74) *Attorney, Agent, or Firm* — Osha Bergman Watanabe & Burton LLP

(57) ABSTRACT

A communication device includes a control unit that obtains information related to Quality of Service (QoS) control and determines whether to transmit information indicating whether the QoS can be provided based on the information related to the QoS control; a transmitting unit that transmits the information indicating whether the QoS can be provided based on a result of the determination to another communication device; and a communication unit that executes radio communication to which the QoS control is applied, the QoS control being executed based on the information indicating whether the QoS can be provided.

5 Claims, 9 Drawing Sheets

(58) Field of Classification Search
CPC . H04L 41/5025; H04L 43/0852; H04L 43/16; H04L 47/2416; H04L 47/283; H04L 47/33; H04L 65/612; H04L 65/80; H04L 47/34

See application file for complete search history.

(56) References Cited

U.S. PATENT DOCUMENTS

| | | |
|---|---|---|
| 2017/0230958 A1 | 8/2017 | Lee et al. |
| 2018/0331958 A1* | 11/2018 | Lee ............... H04W 28/24 |
| 2022/0240122 A1* | 7/2022 | Liu ............... H04B 17/309 |

OTHER PUBLICATIONS

International Search Report issued in PCT/JP2020/021007 on Aug. 11, 2020 (5 pages).
Written Opinion of the International Searching Authority issued in PCT/JP2020/021007 on Aug. 11, 2020 (4 pages).
3GPP TS 23.501 V15.4.0; "3rd Generation Partnership Project; Technical Specification Group Services and System Aspects; System Architecture for the 5G System; Stage 2 (Release 15)"; Dec. 2018 (236 pages).
Office Action issued in Japanese Patent Application No. 2023-050575, mailed on Jan. 9, 2024 (5 pages).

\* cited by examiner

COMMUNICATION DEVICE AND METHOD FOR MOBILE COMMUNICATION BASED ON QUALITY OF SERVICE (QOS) CONTROL

TECHNICAL FIELD

The present invention relates to a communication device and communication method.

BACKGROUND ART

In 3rd Generation Partnership Project (3GPP), in order to realize a further increase in system capacity, a further increase in the data transmission speed, less delay in a radio section, etc., studies are being made with respect to a radio communication method referred to as 5G or New Radio NR) (hereinafter, the radio communication method is referred to as "5G" or "NR"). In 5G, various radio technologies are being studied, in order to satisfy the requirement of setting the delay in the radio section to 1 ms or less while realizing a throughput of 10 Gbps or more.

In NR, studies are being made with respect to a network architecture including 5G Core Network (5GC) corresponding to Evolved Packet Core (EPC) that is the core network in the network architecture of Long Term Evolution (LTE), and Next Generation-Radio Access Network (NG-RAN) corresponding to Evolved Universal Terrestrial Radio Access Network (E-UTRAN) that is Radio Access Network (RAN) in the network architecture of LTE (for example, Non-Patent Document 1).

RELATED ART DOCUMENT

Non-Patent Document

Non-Patent Document 1: 3GPP TS 23.501 V15.4.0 (2018-12)

SUMMARY OF THE INVENTION

Problem to be Solved by the Invention

In a radio network, it has been difficult to design to a bandwidth assurance or a maximum delay for implementing Network as a Service (NaaS) for the entire network because a change in a communication environment, such as out of service area, occurs in the radio network. In addition, it has been difficult to introduce a control of Quality of Service (QoS) in a wired network according to related art to QoS in the radio network, as it is.

The present invention has been made in view of the foregoing, and an object is to enhance accuracy of control related to Quality of Service (QoS) in a radio network.

Means for Solving the Problem

According to the disclosed technology, there is provided a communication device including a control unit that obtains information related to Quality of Service (QoS) control and determines whether to transmit information indicating whether the QoS can be provided based on the information related to the QoS control; a transmitting unit that transmits the information indicating whether the QoS can be provided based on a result of the determination to another communication device; and a communication unit that executes radio communication to which the QoS control is applied, the QoS control being executed based on the information indicating whether the QoS can be provided.

Advantage of the Invention

According to the disclosed technology, accuracy of control related to Quality of Service (QoS) can be enhanced in a radio network.

EMBODIMENTS OF THE INVENTION

Embodiments of the present invention will be described below with reference to the drawings. Note that the embodiments described below are merely examples, and embodiments to which the present invention is applied are not limited to the following embodiments.

In operations of a radio communication system according to the embodiment of the present invention, the existing technology is used as appropriate. The existing technology is, for example, existing LTE; however, the existing technology is not limited to existing LTE. Furthermore, the term "LTE" used in the present specification has a wide meaning including LTE-Advanced and LTE-Advanced or beyond (for example, NR), or wireless LAN (Local Area Network), unless otherwise specified.

Furthermore, in the embodiment of the present invention, the radio parameter, etc., being "configured" means that a predetermined value is "pre-configured", or a radio parameter, which is reported from a network node 10 or a user device 20, is configured.

Figure 1:
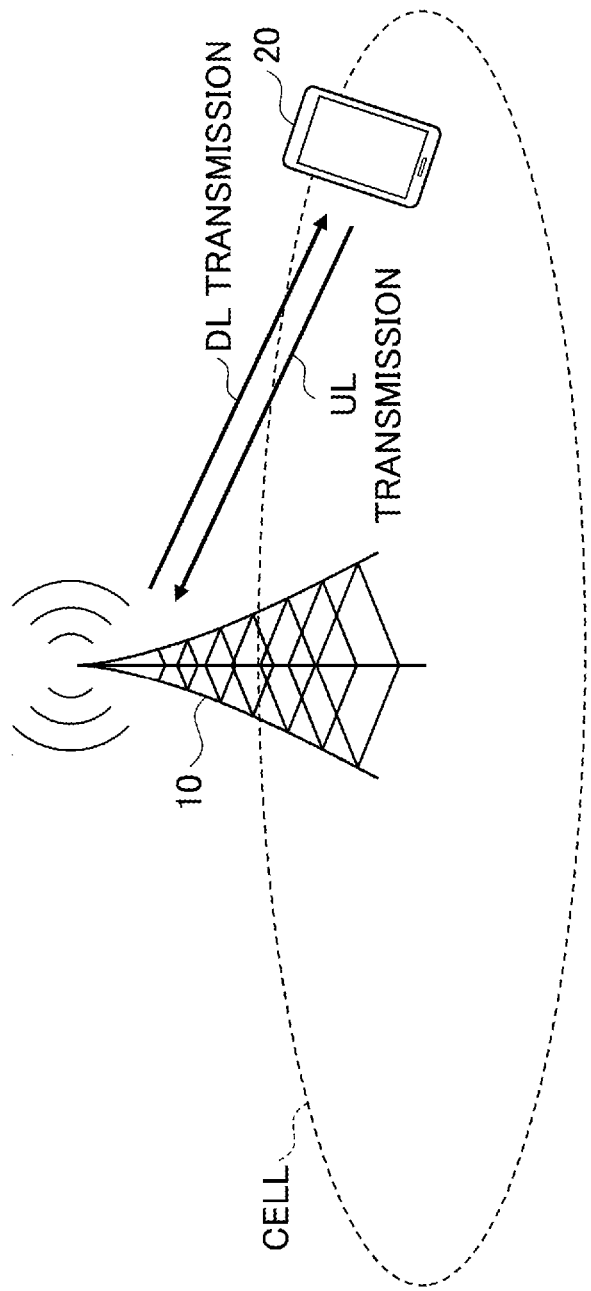
FIG. 1 is a diagram for illustrating a radio communication system according to an embodiment of the present invention.

FIG. 1 is a diagram for illustrating a radio network according to an embodiment of the present invention. As illustrated in FIG. 1, a system including a radio network according to an embodiment of the present invention includes a base station device 10 and a user device 20. In FIG. 1, one base station device 10 and one user device 20 are illustrated. However, this is an example, and there may be multiple base station devices 10 and multiple user devices 20. The base station device 10 may be referred to as a network node 10. The base station device 10 is a communication device that provides one or more cells and performs radio communication with the user device 20.

A physical resource of a radio signal is defined in a time domain and a frequency domain, the time domain may be defined by a number of OFDM symbols, and the frequency domain may be defined by a number of sub-carriers or a number of resource blocks. The base station 10 transmits a synchronization signal and system information to the user device 20. A synchronization signal is, for example, NR-Primary Synchronization signal (PSS) and a NR-Secondary Synchronization Signal (SSS). System information is transmitted, for example, on NR-Physical Broadcast Channel (PBCH), which is also called broadcast information. As illustrated in FIG. 1, the base station device 10 transmits a control signal or data in Downlink (DL) to the user device 20 and receives a control signal or data in Uplink (UL) from the user device 20. The base station 10 and the user device 20 are capable of transmitting and receiving signals while performing beamforming. Furthermore, each of the base station device 10 and the user device 20 can apply Multiple Input Multiple Output (MIMO) communication to DL or UL. Furthermore, each of the base station device 10 and the user device 20 may perform communication through a Secondary Cell (SCell) and a Primary Cell (PCell) by Carrier Aggregation (CA).

The user device 20 is a communication device provided with a radio communication function, such as a smartphone, a cellular phone, a tablet, a wearable terminal, or a communication module for Machine-to-Machine (M2M). As illustrated in FIG. 1, the user device 20 utilizes various communication services provided by a radio communication system by receiving control signals or data in DL from the base station device 10 and transmitting control signals or data in UL to the base station device 10. Furthermore, the user device 20 may be provided with a function as a client application for communicating with an application server arranged in a network.

Figure 2:
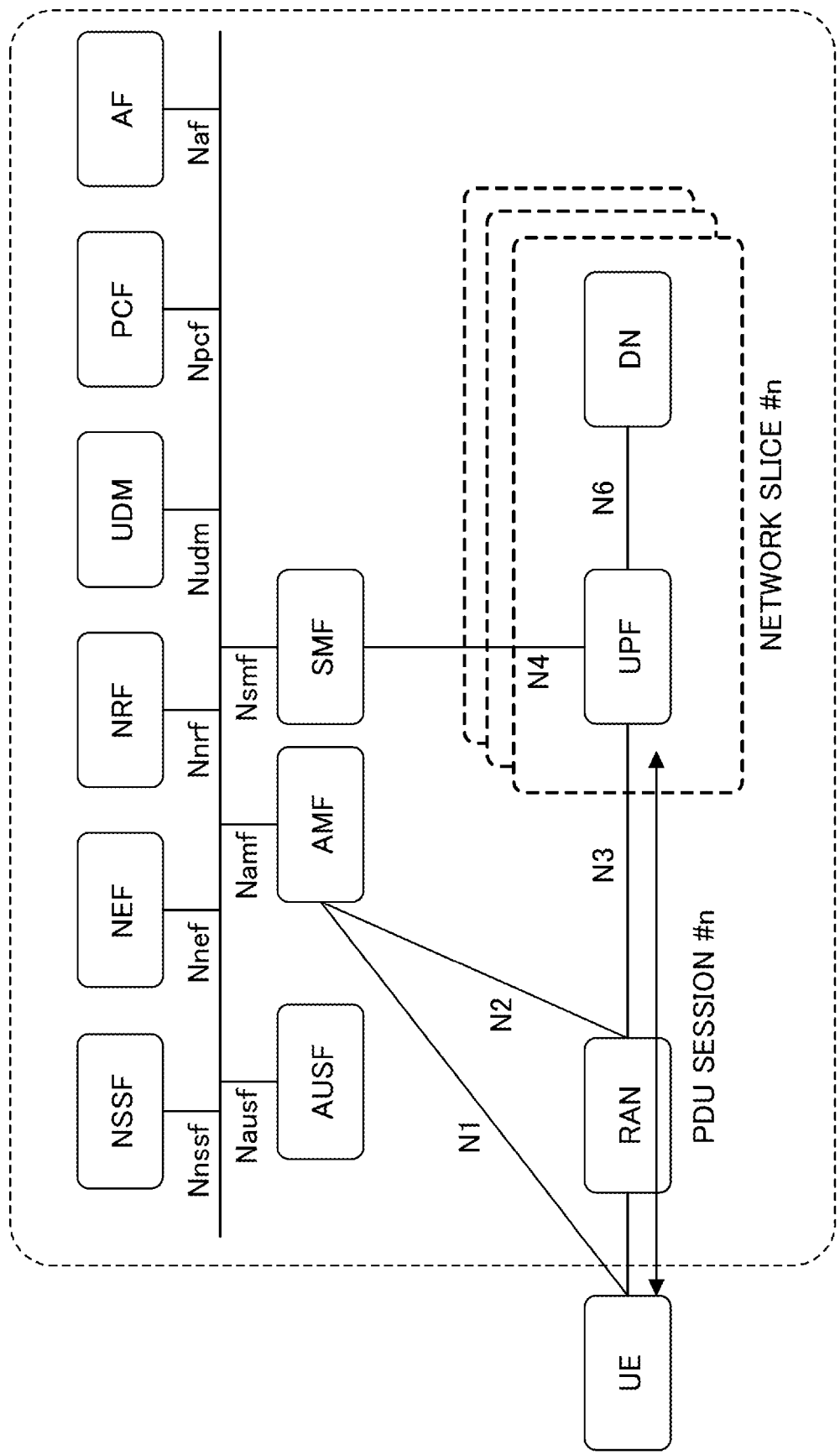
FIG. 2 is a diagram for illustrating a core network according to an embodiment of the present invention.

FIG. 2 is a diagram illustrating a core network in an embodiment of the present invention. As illustrated in FIG. 2, a system including the core network according to the embodiment is formed of a UE, which is the user device 20, and a plurality of network nodes 10. Hereinafter, it is assumed that one network node 10 corresponds to each function; however, one network node 10 may implement a plurality of functions, or a plurality of network nodes 10 may implement one function. Furthermore, the "connection" described below may be a logical connection or a physical connection.

The Radio Access Network (RAN) is the network node 10 having a radio access function, and is connected to the UE, an Access and Mobility Management Function (AMF), and a User Plane Function (UPF). The base station device 10 may be the network node 10 corresponding to the RAN. The AMF is the network node 10 having functions such as termination of a RAN interface, termination of NAS (Non-Access Stratum), registration management, connection management, reachability management, and mobility management. The UPF is the network node 10 having functions such as a Protocol Data Unit (PDU) session point for external interconnection with a Data Network (DN), packet routing and forwarding, and Quality of Service (QoS) handling of a user plane. The UPF and the DN form a network slice. In the radio communication network according to the embodiment of the present invention, a plurality of network slices are configured.

The AMF is connected to the UE, the RAN, a Session Management function (SMF), a Network Slice Selection Function (NSSF), a Network Exposure Function (NEF), a Network Repository Function (NRF), a Unified Data Management (UDM), an Authentication Server Function (AUSF), a Policy Control Function (PCF), and an Application Function (AF). AMF, SMF, NSSF, NEF, NRF, AUSF, PCF, and AF are the network nodes 10 that are connected to each other via interfaces based on the respective services, Namf, Nsmf, Nnssf, Nnef, Nnrf, Nudm, Nausf, Npcf, and Naf.

The SMF is the network node 10 having functions such as managing a session, allocating and managing an Internet Protocol (IP) address of the UE, a Dynamic Host Configuration Protocol (DHCP) function, an Address Resolution Protocol (ARP) proxy, a roaming function, and the like. The NEF is the network node 10 having a function of reporting capabilities and events to another Network Function (NF). The NSSF is the network node 10 having functions such as selecting a network slice to which the UE connects, determining permitted Network Slice Selection Assistance Information (NSSAI), determining NSSAI to be configured, and determining an AMF set to which the UE connects. The PCF is the network node 10 having a function of performing network policy control. The AF is the network node 10 having the function of controlling the application server. The NRF is the network node 10 having a function of discovering an NR instance for providing a service.

Here, services for providing a network called Network as a Service (NaaS) include the following concepts 1)-4).
1) Network construction mainly for hardware introduction. The network may be a Local Area Network (LAN) including network devices, such as backbone routers. For example, it may be an entrustment of constructing a LAN in an office.
2) A construction of a Wide Area Network (WAN). The network may be a WAN including virtualization technologies, such as VPN. For example, it may be a construction of a WAN that enables mutual access between branches and offices.
3) A line service that assumes a specific network configuration or quality. The line service may provide an IoT platform, which may be IoT network installation by LoRAWAN (registered trademark), or IoT solution for a corporation. Furthermore, for example, the line service may be a service for providing an assured bandwidth line service to a general user and may include construction work.
4) A service that provides the above-described 3) to a general user on demand. The service in which the user selects network quality from multiple options and provides a line with quality, e.g. "X Mbps bandwidth assured" and "delay is within Y msec."

The Embodiments of the present invention relate to a technology for implementing NaaS of 4) described above in a radio network. For NaaS in a wired network, in addition to a peak rate and a failure rate, other items, such as a mode of assuring a bandwidth and a delay time classified as QoS, are specified as Service Level Agreements (SLA).

Examples of items of quality that can be provided by an SLA are, for example, the following 1)-9). The SLA is defined in advance in a line service with SLA, and actions taken in the event of a breach are clarified. For example, an agreement may be made such that, if the average delay time exceeds Y msec, the fee will be reduced by Z %.

1) Traffic-related (mean throughput, delay time, packet loss rate, or the like)
2) Operating rate and availability
3) Notification of failure
4) Number of allowed simultaneous connections
5) Backup-related (e.g., frequency, items, storage period)
6) Log-related (e.g., frequency, items, storage period)
7) A contact point system, such as a support desk
8) Failure related (recovery time, response time, on-site response feasibility, or the like)
9) Types of quality levels listed above Here, in a radio network, it is difficult to design bandwidth assurance or delays across the entire network, particularly in a mobile broadband service. Accordingly, a problem arises in providing NaaS that ensures QoS on demand in response to user demand.

TABLE 1

| QCI | Guarantee | Priority | Delay Budget | Loss time | Application |
|---|---|---|---|---|---|
| 1 | GBR | 2 | 100 ms | 1e−2 | VoIP |
| 2 | GBR | 4 | 150 ms | 1e−3 | Video call |
| 3 | GBR | 5 | 300 ms | 1e−6 | streaming |
| 4 | GBR | 3 | 50 ms | 1e−3 | real-time game |
| 5 | Non-GBR | 1 | 100 ms | 1e−6 | IMS signaling |
| 6 | Non-GBR | 7 | 100 ms | 1e−3 | interactive game |
| 7 | Non-GBR | 6 | 300 ms | 1e−6 | TPC |
| 8 | Non-GBR | 8 | 300 ms | 1e−6 | protocol |
| 9 | Non-GBR | 9 | 300 ms | 1e−6 | (browsing, e-mail, file download) |

As illustrated in Table 1, QoS Class Identifier (QCI) is associated with bit rate assurance (Guarantee), priority, Delay Budget, packet loss rate, and applications. For example, if the QCI is 4, the bit rate is guaranteed (GBR: Guaranteed bit rate), the priority is 3, the allowable delay is 50 ms, the packet loss rate is 10 to the minus third, and the application is a real-time game. In accordance with the QCI, the base station device 10 performs scheduling and the like and communicates to satisfy the parameters illustrated in Table 1. However, QoS is not necessarily guaranteed in actual communication.

In a radio network, it may become difficult to assure SLA when a user device moves to a geographical location with poor communication quality. Thus, it is difficult to design bandwidth assurance or delays across the entire network, especially for mobile broadband services. Accordingly, a problem may arise for providing NaaS for assuring QoS on demand in response to user demand.

In the following, a method for defining a quality requirement provided by QoS in a mobile communication is described. In a radio network, it is difficult to apply the definition of QoS defined for a wired network according to related art. For example, because network communication is disabled when the user device 20 just moves out from a service area, it is difficult to implement a service mode in which a service requirement related to bandwidth or delay is guaranteed under any circumstances. If Ultra Reliable and Low Latency Communications (URLLC), for which a further functional enhancement has been studied and which allows flexible and detailed control compared to LTE, is supported in 5G Core Network (5GC) and NR, the potential demand for a line service that enables QoS control in a radio network is expected to be large.

Accordingly, from the viewpoint of a quality requirement for QoS control, for example, it is assumed that a specific usage mode is declared in advance, such as a quasi-static user terminal for which a geographical location is limited, a user terminal with a fixed location, or the like, in addition to a general mobility user terminal. In the embodiments of the present invention, for example, a definition of QoS is proposed, while assuming an operation mode in which QoS control can be applied to the user terminal as described above. The geographic location may be defined by assuming a specific level of communication quality, or a specific geographic location may be assumed due to communication quality.

Conditions for determining whether QoS can be provided or to determine the degree of communication quality provided by QoS (hereinafter referred to as "QoS branch conditions") are specified and requirements for defining the quality provided by different QoS (hereinafter referred to as "QoS requirements") are specified for each QoS branch condition. A determination of a QoS branch condition may be made based on a state of communication measured by a user terminal or a base station apparatus, may be executed based on the information or state maintained by the client application or the application server, or may be executed based on a combination of these. For example, the same user terminal may simultaneously determine a plurality of QoS branch conditions configured for each application, each port of communication, each destination or each source IP address, and the like. For example, a client application may be an application running on the user device 20, and the application server may be a server connected to the DN illustrated in FIG. 2, or an AF.

Figure 3:
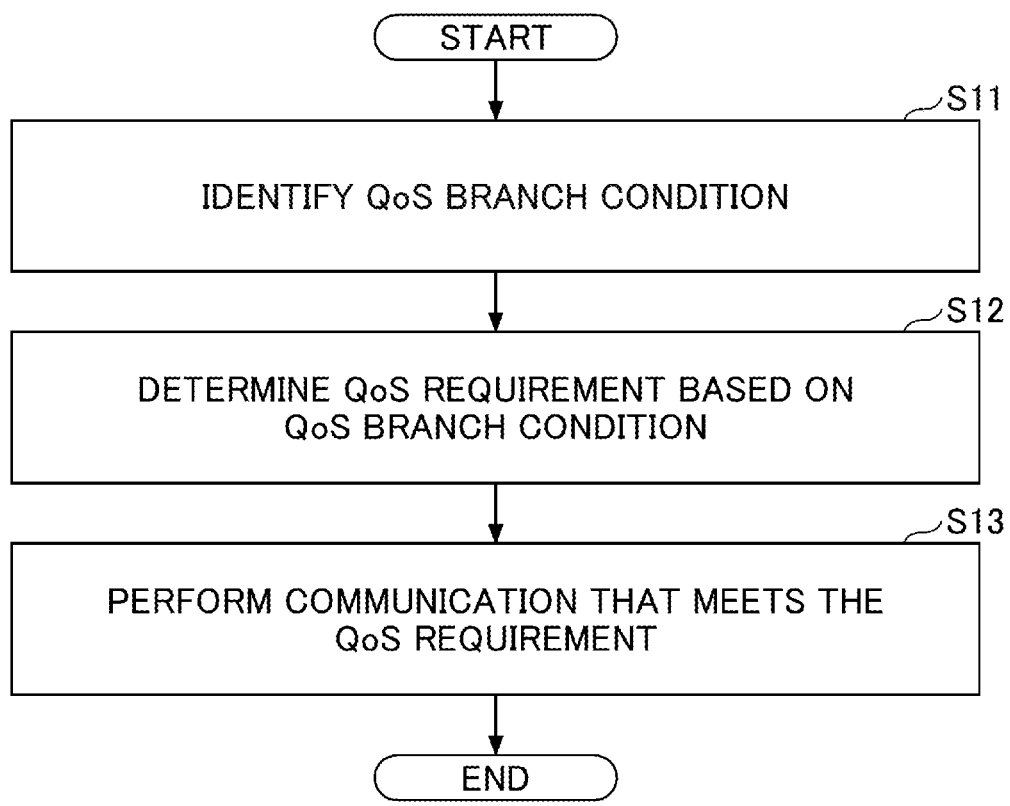
FIG. 3 is a flowchart illustrating an example (1) of a communication to which QoS is applied in an embodiment of the present invention.

FIG. 3 is a flowchart for illustrating an example (1) of communication to which QoS is applied in an embodiment of the present invention. A communication in which the QoS requirement is determined based on the QoS branch condition is described with reference to FIG. 3.

In step S11, the user device 20 or the base station device 10 identifies a QoS branch condition. The QoS branch condition may be predefined or configured at any time. Subsequently, in step S12, the user device 20 or the base station device 10 determines the QoS requirement based on the QoS branch condition. The details of how to determine a QoS requirement from a QoS branch condition are described below. Subsequently, in step S13, the user device 20 or the base station device 10 performs communication that meets the QoS requirement.

Figure 4:
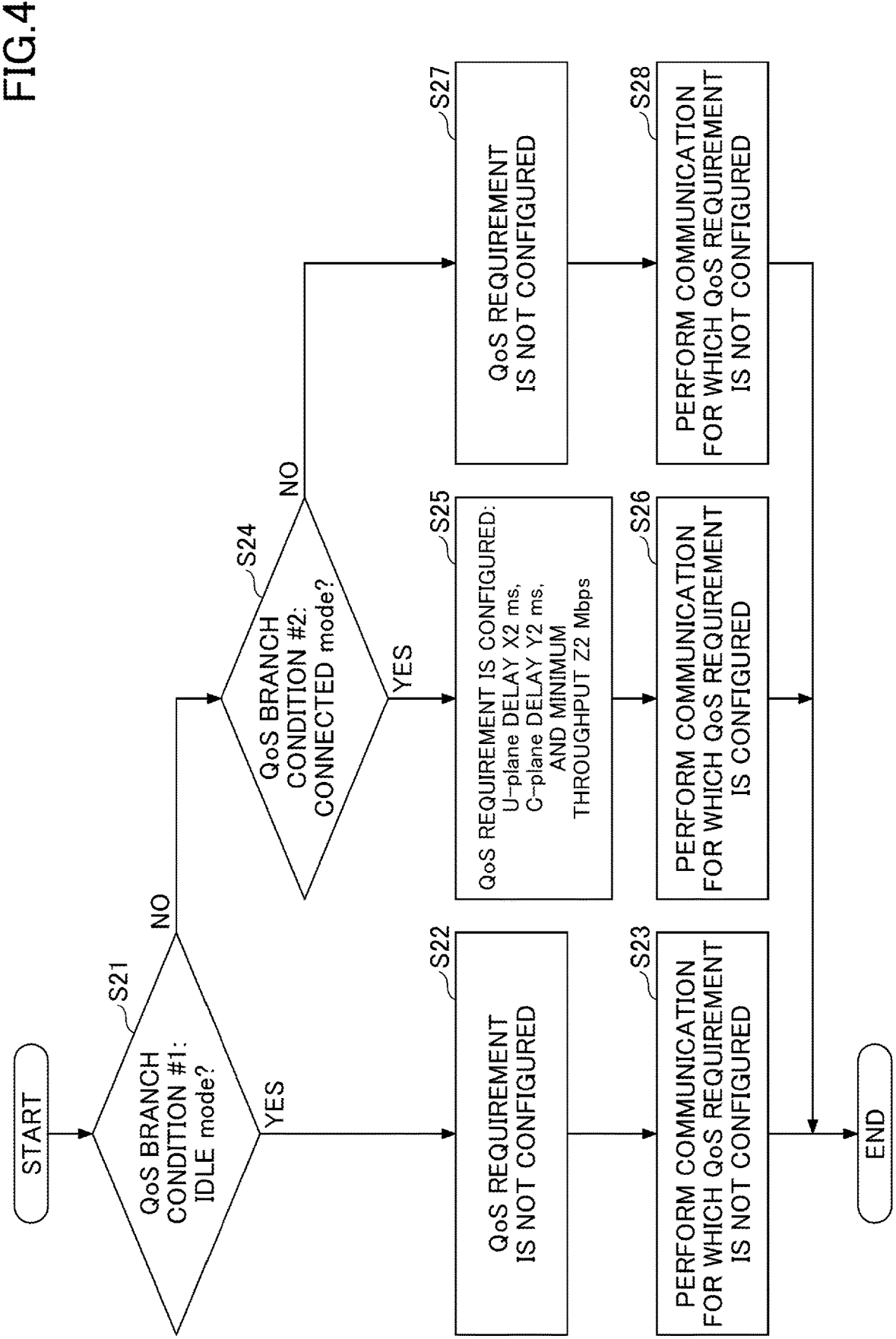
FIG. 4 is a flowchart illustrating an example (2) of a communication to which QoS is applied in an embodiment of the present invention.

FIG. 4 is a flowchart for illustrating an example (2) of communication to which QoS is applied in an embodiment of the present invention. For example, the QoS branch condition may be an RRC state of a radio section, and a QoS requirement may be determined for each RRC state. The flowchart illustrated in FIG. 4 is an illustration of a case in which the user device 20 executes the processes of the flowchart. However, instead of the user device 20, the base station device 10 may execute the processes of the flowchart.

In step S21, the user device 20 determines whether an RRC state that is the QoS branch condition #1 is "IDLE mode." When the RRC state is "IDLE mode" (YES in S21), the process proceeds to step S22, and when the RRC state is not "IDLE mode" (NO in S21), the process proceeds to step S24. In step S22, the user device 20 proceeds to step S23 without setting the QoS requirement. In step S23, the user device 20 executes communication in which the QoS requirement is not set.

In step S24, the user device 20 determines whether the RRC state that is the QoS branch condition #2 is "CONNECTED mode." When the RRC state is "CONNECTED mode" (YES in S24), the process proceeds to step S25, and when the RRC state is not "CONNECTED mode" (NO in S24), the process proceeds to step S27.

In step S25, the user device 20 sets the U-plane delay X2 ms, the C-plane delay Y2 ms, and the minimum throughput Z2 Mbps as QoS requirements and proceeds to step S26. In step S26, the user device 20 performs communications in which the QoS requirements are set. In contrast, in step S27, the user device 20 proceeds to step S28 without setting the QoS requirements. In step S28, the user device 20 performs communication in which the QoS requirement is not set.

Figure 5:
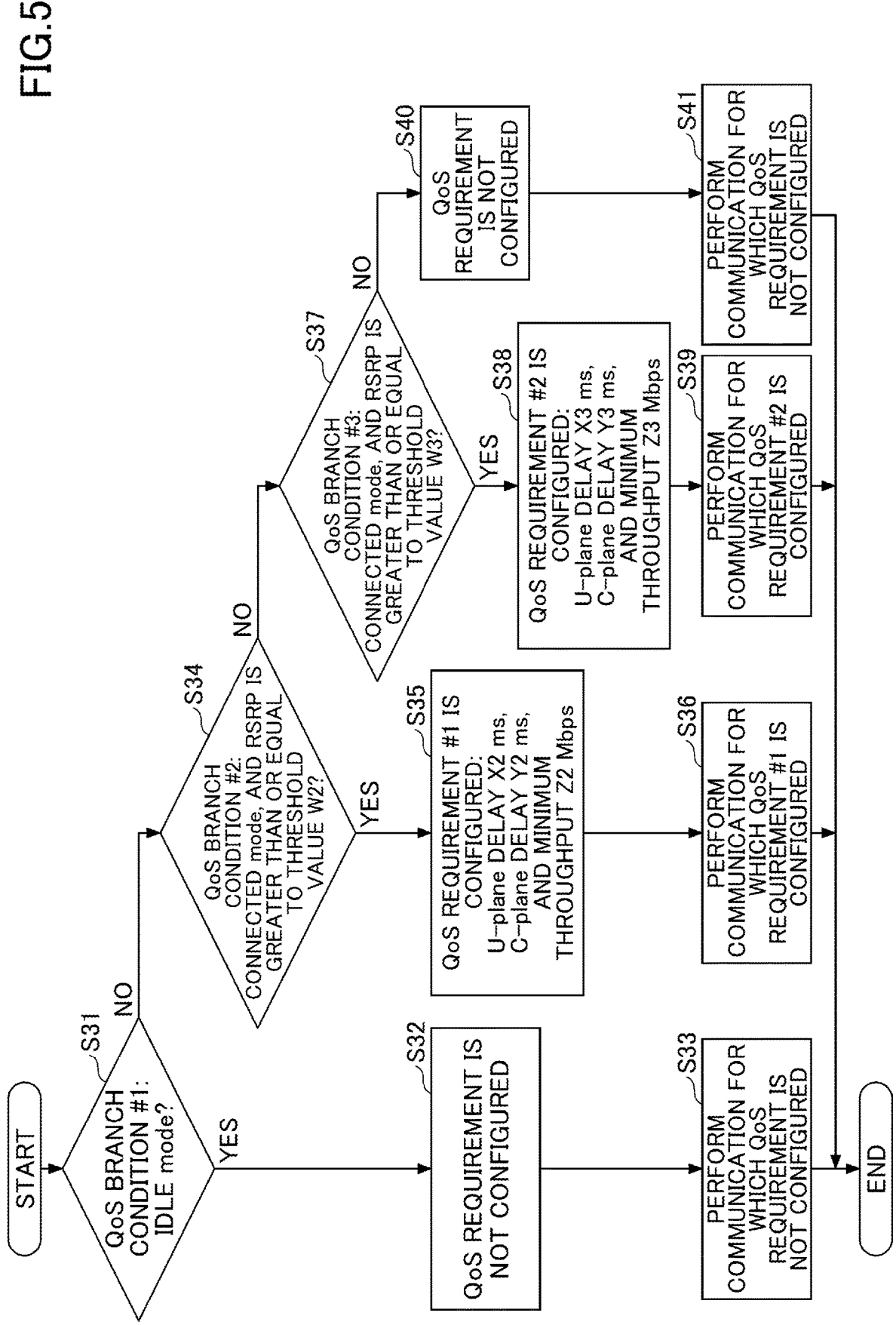
FIG. 5 is a flowchart illustrating an example (3) of a communication to which QoS is applied in an embodiment of the present invention.

FIG. 5 is a flowchart for illustrating an example (3) of communication to which QoS is applied in an embodiment of the present invention. For example, the QoS branch condition may be a condition obtained by combining an RRC state of a radio section and communication quality to be measured by the user terminal. The flowchart illustrated in FIG. 5 is an illustration of a case in which the user device 20 executes the flowchart. However, instead of the user device 20, the base station 10 may execute the flowchart.

In step S31, the user device 20 determines whether an RRC state that is the QoS branch condition #1 is "IDLE mode." When the RRC state is "IDLE mode" (YES in S31), the process proceeds to step S32, and when the RRC state is not "IDLE mode" (NO in S31), the process proceeds to step S34. In step S32, the user device 20 proceeds to step S33 without setting the QoS requirements. In step S33, the user device 20 performs communication in which the QoS requirement is not set.

In Step S34, the user device 20 determines whether the RRC state that is the QoS branch condition #2 is "CONNECTED mode" and whether the measured Reference Signals Received Power (RSRP) is greater than or equal to the predetermined threshold value W2. If the RRC state is "CONNECTED mode" and the RSRP is greater than or equal to the predetermined threshold value W2 (YES of S34), the process proceeds to step S35, and if the RRC state is not "CONNECTED mode" or the RSRP is less than the predetermined threshold value W2 (NO of S34), the process proceeds to step S37.

In step S35, the user device 20 sets the U-plane delay X2 ms, the C-plane delay Y2 ms, and the minimum throughput Z2 Mbps as the QoS requirement #1 and proceeds to step S36. In step S36, the user device 20 performs the communication in which the QoS requirement #1 is set. In Step S37, the user device 20 determines whether the RRC state that is the QoS branch condition #3 is "CONNECTED mode" and whether the measured RSRP is greater than or equal to the predetermined threshold value W3. If the RRC state is "CONNECTED mode" and the RSRP is greater than or equal to the predetermined threshold value W3 (YES of S37), the process proceeds to step S38. In contrast, if the RRC state is not "CONNECTED mode" or the RSRP is less than the predetermined threshold value W3 (NO of S37), the process proceeds to step S40.

In step S38, the user device 20 sets the U-plane delay X3 ms, the C-plane delay Y3 ms, and the minimum throughput Z3 Mbps as the QoS requirement #2 and proceeds to step S39. In step S39, the user device 20 performs the communication in which the QoS requirement #2 is set. In step S40, the user device 20 proceeds to step S41 without setting the QoS requirement. In step S41, the user device 20 performs communication in which the QoS requirement is not set.

For the threshold values W2 and W3 indicated in FIG. 5, W2 may be greater than W3. A QoS branch condition may be configured by combining a condition on specific network information and a condition on information of a radio section. The specific network information may be, for example, a destination IP address of a packet. The information of the radio section may be, for example, an RRC state or measured communication quality.

The QoS branch condition may be defined by the condition formed of any one of 1)-10) and may be defined by the condition formed of any combination of 1)-10).

1) Application type or service classification (e.g., Voice over Internet Protocol (VoIP) or real-time games)
2) A destination IP address or a source IP address of a packet
3) Communication port
4) RRC state
5) Radio quality measured by the user (e.g., RSRP or Reference Signal Received Quality (RSRQ))
6) A state of a terminal other than radio quality measured by the user (e.g., a moving state of a terminal measured by an acceleration sensor or a gyro sensor)
7) Average throughput, delay time, delay fluctuation (jitter), or packet loss rate
8) With or without a QoS control request from a client application
9) With or without a QoS control request from an application server
10) A Radio Access Technology (RAT) type in a service area For example, if a QoS branch condition is defined in terms of radio quality to be measured, a higher quality QoS requirement may be specified for a high radio quality state than a low radio quality state. For example, when a QoS branch condition is defined in a moving state of the terminal, the QoS requirement may be defined to be of lower quality in a state of moving at a higher speed than in the state of moving at a lower speed.

A QoS requirement specified by a QoS branch condition may be defined by any of 1)-9) below, or may be defined by any combination of 1)-9) below.

1) Parameters related to traffic (e.g., throughput, delay time, delay fluctuation, or packet loss rate)
2) Operating rate or availability
3) Notification of failure
4) Number of allowed simultaneous connections
5) Parameters related to the backup (e.g., frequency, item, or storage period)
6) Parameters related to the log (e.g., frequency, entry, or storage period)
7) A service system, such as a support desk
8) Items related to response to failures (e.g. recovery time, response time, or availability of on-site response)
9) Multiple types indicating the quality level described in 1)-8) above In the following, a method for notifying a quality requirement provided by QoS in mobile communications is described. Based on the various information related to the QoS control, a determination related to the QoS requirement may be made, and a notification of information indicating whether the QoS is allowed related to the determination result may be transmitted. A client application running on the user device 20, an application server 10 providing services, an application server 10 provided with a QoS control function, or other network node 10 may provide a notification of information indicating whether the QoS can be provided in one direction or bidirectionally. The client application running on the user device 20, the application server 10 providing the service, the application server 10 provided with a QoS control function, or an application interface called by another network node 10 may specify a notification of information indicating whether the QoS can be provided. Notification of the information indicating whether the QoS can be provided may include a method for determining a QoS requirement.

For example, in the view point of an operation of an application related to QoS control, in response to determining that the provision of QoS is disallowed, or if it is expected that the provision of QoS becomes difficult temporarily, the client application 20 or the application server 10 may transmit, to an opposite communication destination, a notification that the QoS control is temporarily stopped or suspended, as the information indicating whether the QoS can be provided.

Figure 6:
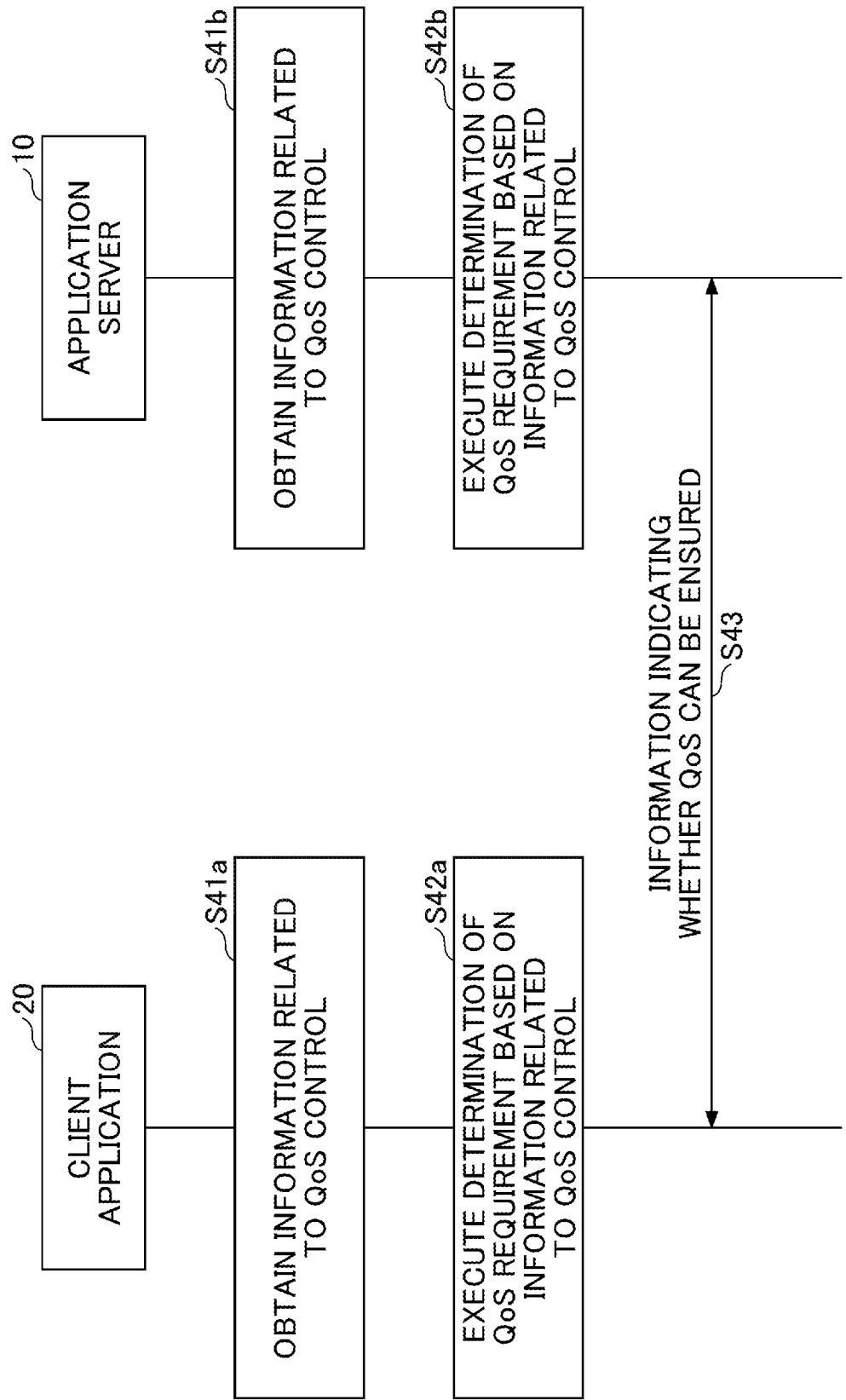
FIG. 6 is a sequence diagram illustrating an example of a notification of QoS in an embodiment of the present invention.

Various types of information related to QoS control may include any one of 1)-4) below.
1) RRC state
2) Radio quality measured by the user (e.g., RSRP or RSRQ)
3) A state of a terminal other than the radio quality measured by the user (e.g., a moving state of the terminal measured by an acceleration sensor or a gyro sensor)
4) An average throughput, a delay time, a delay fluctuation, or a packet loss rate An operation related to a notification of information indicating whether the QoS can be provided may be changed based on any of 1)-6) below. For example, a determination of a QoS requirement of various information related to QoS control may be changed based on any of 1) to 6) below.
1) A type of an application or a service classification (e.g., VoIP or real-time games)
2) A destination IP address or a source IP address of a packet
3) Communication port
4) With or without a QoS control request from a client application
5) With or without a QoS control request from an application server
6) A RAT type in the service area FIG. 6 is a sequence diagram for illustrating an example of a QoS-related notification according to an embodiment of the present invention. With reference to FIG. 6, a sequence is described in which a determination related to a QoS requirement is made based on various information related to the QoS control and in which information indicating whether the QoS can be provided related to the determination result is notified.

In step S41*a*, the client application 20 acquires information related to the QoS control. Subsequently, the client application 20 determines a QoS requirement based on information related to QoS control (S42*a*). Subsequently, the client application 20 transmits information indicating whether the QoS can be provided based on the result of the determination to the application server 10 (S43). In other words, a determination of a QoS requirement is a determination as to whether to transmit information indicating whether the QoS can be provided. In step S41*b*, the application server 10 obtains information related to the QoS control. Subsequently, the application server 10 determines a QoS requirement based on the information related to the QoS control (S42*b*). Subsequently, the application server 10 transmits information indicating whether the QoS can be provided, based on the result of the determination, to the client application 20 (S43). In other words, a determination of a QoS requirement is a determination as to whether to transmit information indicating whether the QoS can be provided. Either of the client application 20 or the application server 10 may transmit information indicating whether the QoS can be provided in step S43. The client application 20 or the application server 10 may control the QoS based on the information indicating whether the received QoS can be provided and perform communication in which the QoS control is applied. For example, the QoS control may change the QoS requirement or the QoS control may change whether the QoS is provided.

Figure 7:
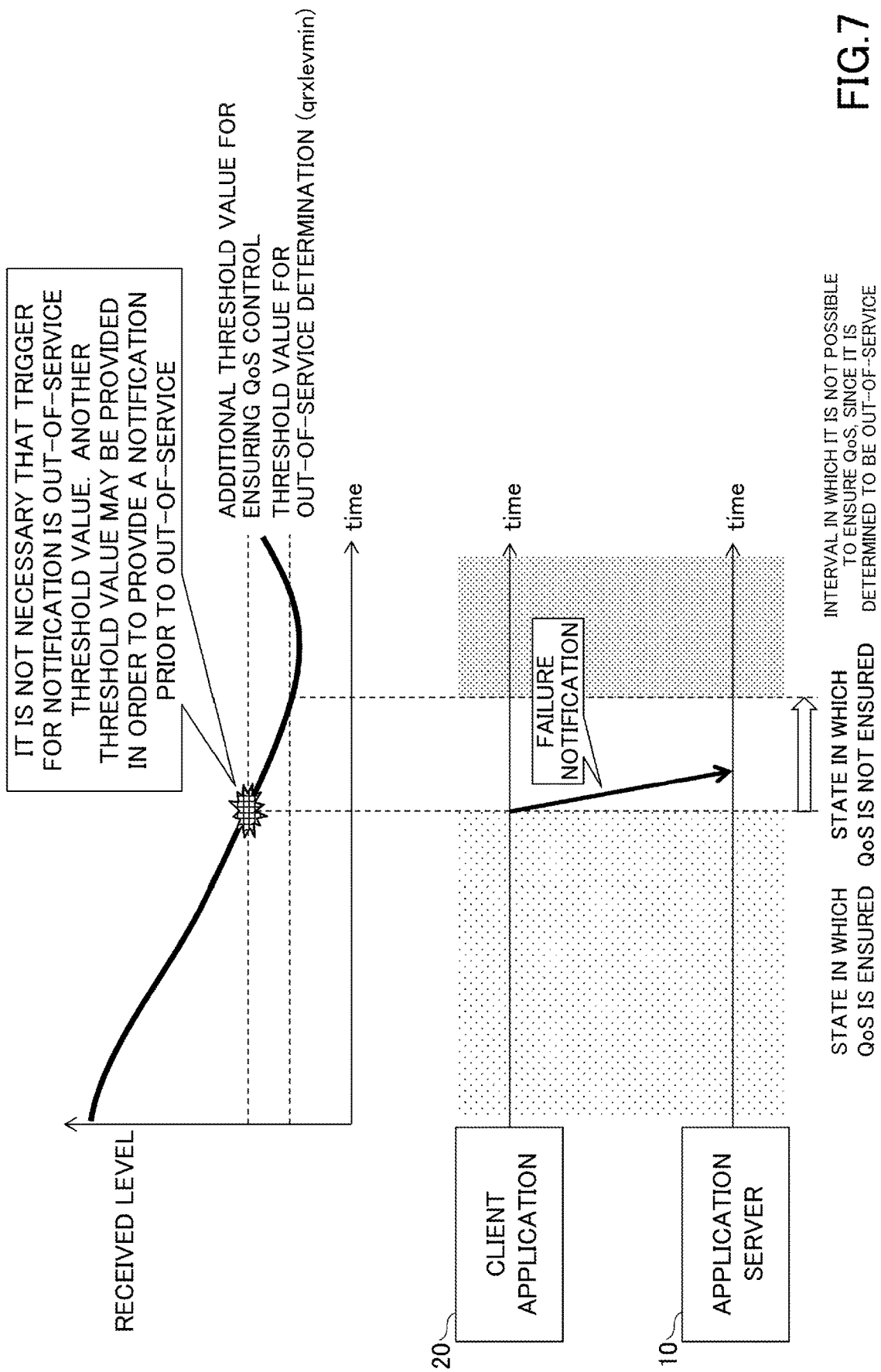
FIG. 7 is a diagram illustrating an example of a notification of QoS in an embodiment of the present invention.

FIG. 7 is a diagram for illustrating an example of a QoS-related notification according to an embodiment of the present invention. By using FIG. 7, an example is described in which a determination of a QoS requirement is made based on various information related to QoS control, and a notification of information indicating whether QoS can be provided, which is related to the determination result, is transmitted. In FIG. 7, it is assumed that the application server 10 is a device that provides QoS.

As illustrated in FIG. 7, the client application 20 measures a received level (e.g., RSRP) as information related to the QoS control and compares an additional threshold value for ensuring QoS control corresponding to a reception level higher than the threshold value (qrxlevmin) used for the out-of-service area determination as a determination related to the QoS requirement. If the received level falls below the additional threshold value, a "failure notification" may be sent to the application server 10. Namely, a state may be controlled so that the state prior to the "failure notification" may be a state in which QoS is provided, and the state becomes a state in which QoS is not provided at a time point of the "failure notification." If the reception level drops further after the "failure notification", the state becomes that of out-of-the-service-area, and the provision of QoS is disallowed. The additional threshold value used for the determination of the QoS requirement may be the same as the threshold value used for the out-of-service-area determination or may be a different value. The additional threshold value used for determining the QoS requirement may be the same value as the threshold value used for the determination of the QoS branch condition, or may be a different value.

If a QoS requirement is defined by information related to multiple QoS controls, information indicating a change in information related to QoS control that can be assured may be included in the "failure notification." The application server 10 that receives the information indicating that the information related to the QoS control that can be assured has changed may change the QoS requirement based on the information indicating that the QoS requirement that can be assured has changed.

When a received level increases in contrast to the example in which the received level deteriorates as illustrated in FIG. 7, in response to detecting that the received level has returned to a sufficient quality, the client application 20 may transmit a notification indicating that the received level has returned to a state in which QoS provision is allowed to the application server 10.

The application server 10 may request and cause the client application 20 to report information indicating whether QoS can be provided or information necessary to determine whether the QoS can be provided.

According to the above-described embodiments, the network node 10 or the user device 20 can obtain information related to the QoS control, determine a requirement defining quality provided by the QoS, and transmit a notification of information indicating whether the QoS can be provided. The network node 10 or the user device 20 can perform the QoS control based on the received information indicating whether the QoS can be provided.

Namely, in a radio network, accuracy of control related to Quality of Service (QoS) can be enhanced.

(Apparatus Configuration)

Next, a functional configuration example of the network node 10 and the user device 20 that execute the above-described processes and operations, will be described. The network node 10 and the user device 20 include functions for implementing the above-described embodiments. However, each of the network node 10 and the user device 20 may have only some of the functions of the embodiments.

<Network Node 10>

Figure 8:
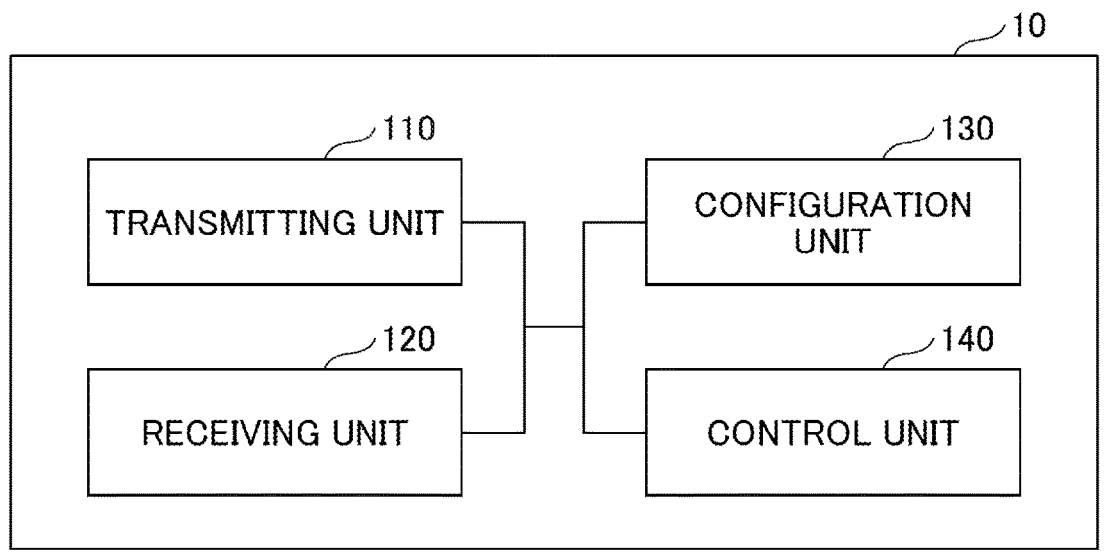
FIG. 8 is a diagram illustrating an example of a functional configuration of a network node 10 according to an embodiment of the present invention.

FIG. 8 is a diagram illustrating an example of a functional configuration of the network node 10. As illustrated in FIG. 8, the network node 10 includes a transmitting unit 110, a receiving unit 120, a configuration unit 130, and a control unit 140. The functional configuration illustrated in FIG. 8 is only an example. As long as the operations according to the embodiment of the present invention can be executed, the functional division and the name of the functional unit may be any functional division and name. Furthermore, the network node 10 having a plurality of different functions on the system architecture may be configured by a plurality of the network nodes 10 separated for each function.

The transmitting unit 110 includes a function of generating signals to be transmitted to the user device 20 or another network node 10, and wirelessly transmitting the signals. The receiving unit 120 includes a function of receiving various signals transmitted from the user device 20, and obtaining, for example, information of a higher layer from the received signals. Furthermore, the transmitting unit 110 includes a function for transmitting, to the user device 20, a NR-PSS, a NR-SSS, a NR-PBCH, a DL/UL control signal, a DL reference signal, or the like.

The configuration unit 130 stores pre-configured configuration information and various types of configuration information to be transmitted to the user device 20, in a storage device, and reads out the information from the storage device if necessary. The content of the configuration information is, for example, information related to QoS parameter control for a PDU session.

As described in the embodiments, the control unit 140 performs processing related to QoS control for a PDU session between the user device 20 and the u-plane. Furthermore, the control unit 140 may perform processing for implementing a function of an application server. A functional unit related to signal transmission in the control unit 140 may be included in the transmitting unit 110, and a functional unit related to signal reception in the control unit 140 may be included in the receiving unit 120.

<User Device 20>

Figure 9:
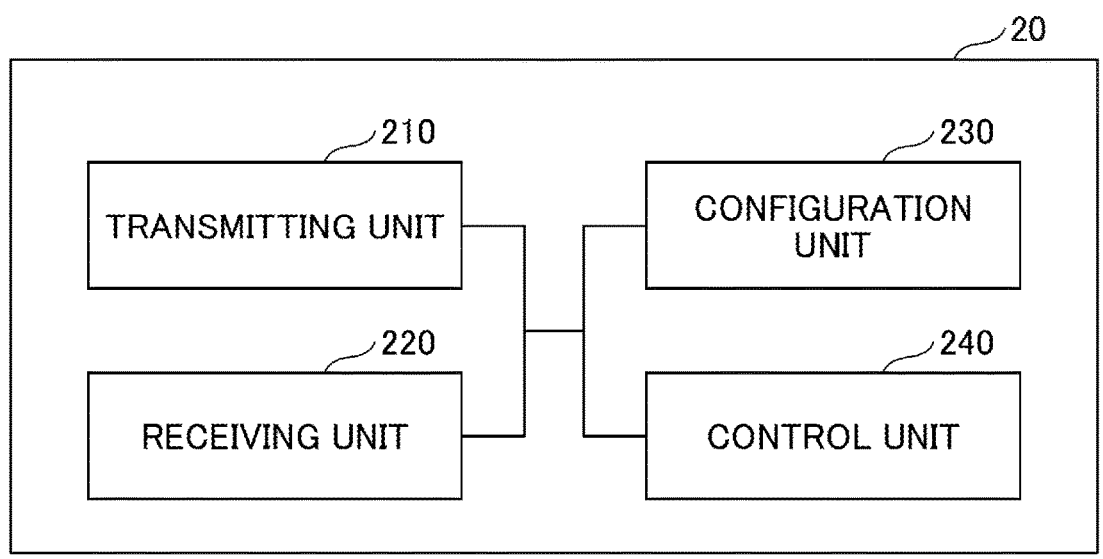
FIG. 9 is a diagram illustrating an example of a functional configuration of a user device 20 according to an embodiment of the present invention.

FIG. 9 is a diagram illustrating an example of a functional configuration of the user device 20. As illustrated in FIG. 9, the user device 20 includes a transmitting unit 210, a receiving unit 220, a configuration unit 230, and a control unit 240. The functional configuration illustrated in FIG. 9 is only an example. As long as the operations according to the embodiment of the present invention can be executed, the functional division and the name of the functional unit may be any functional division and name.

The transmitting unit 210 creates transmission signals from the transmission data and wirelessly transmits the transmission signals. The receiving unit 220 wirelessly receives various types of signals and obtains signals of a higher layer from the received signals of the physical layer. Furthermore, the receiving unit 220 has a function of receiving the NR-PSS, the NR-SSS, the NR-PBCH, the DL/UL/SL control signal, the reference signal, or the like, transmitted from the network node 10. Furthermore, for example, the transmitting unit 210 transmits, to another user device 20, a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), or the like, as D2D communication, and the receiving unit 220 receives, from another user device 20, a PSCCH, PSSCH, PSDCH, a PSBCH, or the like. Furthermore, the transmitting unit 210 and the receiving unit 220 is provided with a transmitting and receiving function or the like for a wireless LAN or a wired LAN.

The configuration unit 230 stores various types of configuration information received from the network node 10 or the user device 20 by the receiving unit 220, in a storage device, and reads out the information from the storage device, if necessary. Furthermore, the configuration unit 230 also stores pre-configured configuration information. The content of the configuration information is, for example, information related to QoS parameter control for a PDU session, or the like.

As described in the embodiments, the control unit 240 performs processing related to QoS control of a PDU session between the user device 20 and the user plane. Furthermore, the control unit 240 may performs processing for implementing a function of a client application. A functional unit related to signal transmission in the control unit 240 may be included in the transmitting unit 210, and a functional unit related to signal reception in the control unit 240 may be included in the receiving unit 220.

(Hardware Configuration)

The block diagrams (FIGS. 8 and 9) used for describing the embodiment described above are of blocks of functional units. These functional blocks (constituent units) are implemented by any combination of at least one of hardware and software. Methods for implementing each functional block are not particularly limited. That is, each functional block may be implemented by using one device in which elements are physically or logically combined, or two or more devices physically or logically separated may be directly or indirectly (for example, in a wired manner, a wireless manner) connected to each other, and each functional block may be implemented by these plural devices. The functional blocks may be implemented by combining software with the above one device or a plurality of devices.

The functions include determining, deciding, judging, calculating, computing, processing, deriving, investigating, searching, confirming, receiving, transmitting, outputting, accessing, resolving, selecting, adopting, establishing, comparing, assuming, expecting, considering, broadcasting, notifying, communicating, forwarding, configuring, reconfiguring, allocating, mapping, assigning, and so forth; however, the functions are not limited as such. For example, a function block (constituent unit) that implements the transmission function is referred to as a transmitting unit or a transmitter. In any case, as described above, the implementation method is not particularly limited.

Figure 10:
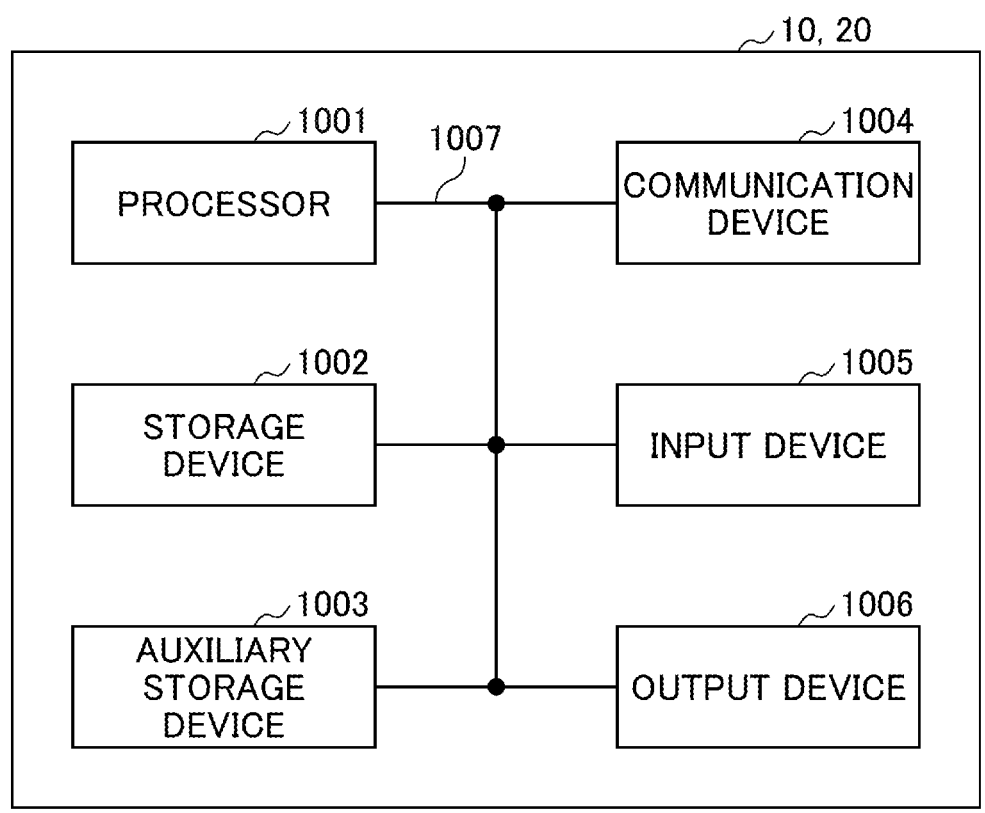
FIG. 10 is a diagram illustrating an example of a hardware configuration of the network node 10 or the user device 20.

For example, the network node 10, the user device 20 and the like according to the embodiment of the present disclosure may function as a computer that performs processes of the radio communication method according to the present disclosure. FIG. 10 is a diagram illustrating an example of a hardware configuration of the network node 10 and the user device 20 according to the embodiment of the present disclosure. The network node 10 and the user device described above may be formed as a computer apparatus physically including a processor 1001, a storage device 1002, an auxiliary storage device 1003, a communication device 1004, an input device 1005, an output device 1006, a bus 1007, etc.

Note that in the following description, the term "device" can be read as a circuit, a device, a unit. The hardware configuration of the network node 10 and the user device 20 may be configured to include one or more devices illustrated in the figure, or may be configured to not include some of the devices.

The functions of the network node 10 and the user device 20 are implemented by loading predetermined software (program) in hardware such as the processor 1001 and the storage device 1002, computing by the processor 1001, controlling communication by the communication device 1004, and controlling at least one of reading and writing of data in the storage device 1002 and the auxiliary storage device 1003.

The processor 1001 operates, for example, the operating system to control the entire computer. The processor 1001 may be formed of a central processing unit (CPU) including an interface with a peripheral device, a control device, an arithmetic device, and a register. For example, the above control unit 140, the control unit 240, and the like may be implemented by the processor 1001.

Furthermore, the processor 1001 loads a program (program code), a software module, data, or the like from at least one of the auxiliary storage device 1003 and the communication device 1004, into the storage device 1002, and executes various processes according to the program, the software module, or the data. As the program, a program for causing a computer to execute at least part of the operations described in the above embodiment is used. For example, the control unit 140 of the network node 10 illustrated in FIG. 8 may be implemented by a control program stored in the storage device 1002 and operating on the processor 1001. Furthermore, the control unit 240 of the user device 20 illustrated in FIG. 9 may be implemented by a control program stored in the storage device 1002 and operating on the processor 1001. Although it has been described that the above-described various processes are executed by one processor 1001, the processes may be executed simultaneously or sequentially by two or more processors 1001. The processor 1001 may be implemented with one or more chips. Note that the program may be transmitted from the network via an electric communication line.

The storage device 1002 is a computer-readable recording medium and may be formed of at least one of a Read Only Memory (ROM), an Erasable Programmable ROM (EPROM), an Electrically Erasable Programmable ROM (EEPROM), and a Random Access Memory (RAM). The storage device 1002 may be referred to as a register, a cache, a main memory, and the like. The storage device 1002 can store executable programs (program codes), software modules, and the like for implementing the communication method according to the embodiment of the present disclosure.

The auxiliary storage device 1003 is a computer-readable recording medium, and may be formed of, for example, at least one of an optical disk such as a Compact Disc ROM (CD-ROM), a hard disk drive, a flexible disk, a magneto-optical disk (for example, a compact disk, a digital versatile disk, and a Blu-ray (registered trademark) disk), a smart card, a flash memory (for example, a card, a stick, and a key drive), a floppy (registered trademark) disk, a magnetic strip, and the like. The above-described storage medium may be, for example, a database including at least one of the storage device 1002 and the auxiliary storage device 1003, a server, or another appropriate medium.

The communication device 1004 is hardware (transmission/reception device) for performing communication between computers via at least one of a wired network and a wireless network, and is also referred to as a network device, a network controller, a network card, a communication module, and the like, for example. The communication device 1004 may be configured by including a high-frequency switch, a duplexer, a filter, a frequency synthesizer, and the like in order to implement at least one of frequency division duplex (FDD) and time division duplex (TDD). For example, a transmission/reception antenna, an amplifier unit, a transmission/reception unit, a transmission line interface, and the like may be implemented by the communication device 1004. In the transmission/reception unit, the transmission unit and the reception unit may be physically or logically separated from each other.

The input device 1005 is an input device (for example, a keyboard, a mouse, a microphone, a switch, a button, and a sensor) that accepts input from the outside. The output device 1006 is an output device (for example, a display, a speaker, and an LED lamp) that performs output to the outside. Note that the input device 1005 and the output device 1006 may be integrated (for example, a touch panel).

Furthermore, the devices such as the processor 1001 and the storage device 1002 are connected by a bus 1007 for communicating information. The bus 1007 may be formed of a single bus or may be formed by using different buses between the devices.

Furthermore, the network node 10 and the user device 20 may include hardware such as a microprocessor, a digital signal processor (DSP: Digital Signal Processor), an application specific integrated circuit (ASIC), a programmable logic device (PLD), and a field programmable gate array (FPGA), and a part of or all of the functional blocks may be implemented by the hardware. For example, the processor 1001 may be implemented by using at least one of these hardware elements.

Conclusion of the Embodiments

As described above, according to the embodiments of the present invention, there is provided a communication device including a control unit that obtains information related to Quality of Service (QoS) control and determines whether to transmit information indicating whether the QoS can be provided based on the information related to the QoS control; a transmitting unit that transmits the information indicating whether the QoS can be provided based on a result of the determination to another communication device; and a communication unit that executes radio communication to which the QoS control is applied, the QoS control being executed based on the information indicating whether the QoS can be provided.

With the above-described configuration, the network node 10 or the user device 20 can obtain information related to the QoS control, determine a requirement defining the quality provided by the QoS, and transmit a notification of the information indicating whether the QoS can be provided. The network node 10 or the user device 20 can perform the QoS control based on the information indicating whether the received QoS can be provided. Namely, in a radio network, the accuracy of control related to Quality of Service (QoS) can be enhanced.

The QoS may be applied to a communication device in which a specific level of communication quality is assumed or a specific geographical location is assumed due to communication quality. This configuration allows the network node 10 or the user device 20 to implement QoS in a radio network.

The information related to the QoS control may be a measurement result measured by the communication device, and the measurement result may include at least one of the following:
  a) a Radio Resource Control (RRC) state;
  b) a measured radio quality;
  c) a measured moving state of the communication device; or
  d) an average throughput, a delay time, a delay fluctuation, or a packet loss rate. According to this configuration, the network node or the user device 20 can determine a QoS requirement.

A determination of out-of-service area or a determination of a requirement to define a communication quality to be provided by the QoS may be made by using a threshold value that is same as or different from a threshold value of a communication quality to be used in determining whether to transmit the information indicating whether the QoS can be provided. According to this configuration, the network node 10 or the user device 20 can determine a QoS requirement.

The requirement to define the communication quality to be provided by the QoS may include at least one of the following:
  a) an average throughput, a delay time, a delay fluctuation, or a packet loss rate;
  b) an operation rate; or
  c) a number of allowed simultaneous connections. According to this configuration, the network node 10 or the user device 20 can transmit a notification of information indicating whether QoS can be provided by determining a QoS requirement.

Furthermore, according to the embodiments of the present invention, there is provided a communication method executed by a communication device, the communication method including a control procedure of obtaining information related to Quality of Service (QoS) control and determining whether to transmit information indicating whether the QoS can be provided based on the information related to the QoS control; a transmitting procedure of transmitting the information indicating whether the QoS can be provided based on a result of the determination to another communication device; and a communication procedure of executing radio communication to which the QoS control is applied, the QoS control being executed based on the information indicating whether the QoS can be provided.

With the above-described configuration, the network node 10 or the user device 20 can obtain information related to the QoS control, determine a requirement defining the quality provided by the QoS, and transmit a notification of the information indicating whether the QoS can be provided. The network node 10 or the user device 20 can perform the QoS control based on the information indicating whether the received QoS can be provided. Namely, in a radio network, the accuracy of control related to Quality of Service (QoS) can be enhanced.

Supplement of Embodiment

The embodiment of the present invention is described above; however the disclosed invention is not limited to the embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. The order of the processes in each of the processing procedures described in the embodiment may be re-arranged, provided that they do not contradict. For the convenience of description, the network node 10 and the user device 20 are described by using the functional block diagrams; however, such devices may be implemented in hardware, software, or combinations thereof. The software to be executed by the processor included in the network node 10 in accordance with the embodiment of the present invention and the software to be executed by the processor included in the user device 20 in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

Indication of information is not limited to the aspect or embodiment described in this disclosure and may be given by using any other method. For example, the notification of information may be given physical layer signaling (for example, Downlink Control Information (DCI), uplink control information (UCI)), higher layer signaling (for example, radio resource control (RRC) signaling, medium access control (MAC) signaling, broadcast information (master information block (MIB), system information block (SIB))), other signals, or a combination thereof. Further, the RRC signaling may be referred to as an "RRC message" and may be, for example, an RRC connection setup message, an RRC connection reconfiguration message, or the like.

Each aspect and embodiment described in this disclosure is applicable to at least one of Long Term Evolution (LTE), LTE-Advanced (LTE-A), SUPER 3G, IMT-Advanced, 4th generation mobile communication system (4G), 5th generation mobile communication system (5G), future radio access (FRA), New Radio (NR), W-CDMA (registered trademark), GSM (registered trademark), CDMA2000, ultra-mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), and systems using any other appropriate systems and next generation systems expanded on the basis of the systems. Furthermore, each aspect and embodiment described in this disclosure may be applied to a combination of a plurality of systems (for example, a combination of at least one of LTE and LTE-A, and 5G)

The processing procedures, the sequences, the flowcharts, and the like of the respective aspects/embodiments described in this specification may be reversed in order as long as there is no contradiction. For example, the method described in this disclosure presents elements of various steps in an exemplary order and is not limited to a presented specific order.

In the present specification, a specific action that is supposed to be performed by the network node 10 may be performed by an upper node in some cases. In the network configured with one or a plurality of network nodes including the network node 10, various actions performed for communication with the user device 20 can be obviously performed by at least one of the network node 10 and any network node (for example, an MME or an S-GW is considered, but it is not limited thereto) other than the network node 10. The example in which the number of network nodes excluding the network node 10 is one has been described above, but the other network nodes may be a combination of a plurality of other network nodes (for example, an MME and an S-GW).

Information or signals, etc., described in the present disclosure can be output from the higher layer (or the lower layer) to the lower layer (or the higher layer). Information, etc., may be input/output via a plurality of network nodes. Input and output information, etc., may be stored in a specific place (for example, a memory) or may be managed by using a management table. Input and output information, etc., may be overwritten, updated, or additionally written. Output information, etc., may be deleted. Input information, etc., may be transmitted to another device.

The determination according to the present disclosure may be performed in accordance with a value (0 or 1) indicated by one bit, may be performed in accordance with a Boolean value (true or false), or may be performed by a comparison of numerical values (for example, a comparison with a value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like, regardless of whether software is called software, firmware, middleware, a microcode, a hardware description language, or any other name.

Further, software, commands, information, etc., may be transmitted and received via a transmission medium. For example, when software is transmitted from a web site, a server, or any other remote source using at least one of a wired technology (a coaxial cable, a fiber optic cable, a twisted pair, or a digital subscriber line (DSL: Digital Subscriber Line)) and a wireless technology (infrared rays, a microwave or the like), at least one of the wired technology and the wireless technology is included in a definition of a transmission medium.

Information, signals, and the like described in the present disclosure may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or an arbitrary combination thereof.

The terms described in this disclosure and terms necessary for understanding this specification may be replaced with terms having the same or similar meanings. For example, at least one of a channel and a symbol may be a signal (signaling). Further, a signal may be a message. Further, a component carrier (CC) may be referred to as a "carrier frequency," a "cell," a "frequency carrier", or the like.

The terms "system" and "network" used in the present disclosure are used interchangeably.

Further, information, parameters, or the like described in the present disclosure may be indicated by using absolute values, may be indicated by using relative values from predetermined values, or may be indicated by using corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, the PUCCH and the PDCCH), information elements, and the like can be identified by suitable names, the various names allocated to the various channels and the information elements are not limited in any respect.

In the present disclosure, the terms "base station," "radio base station," "base station apparatus," "fixed station," "Node B," "eNodeB (eNB)," "gNodeB (gNB)," "access point," "transmission point," "reception point," "transmission/reception point," "cell," "sector," "sector group," "carrier," "component carrier" can be used interchangeably. The base station is also referred to as a macro cell, a small cell, a Femto cell, a pico cell, or the like.

The base station can accommodate one or more (for example, three) cells. When the base station accommodates a plurality of cells, the entire coverage area of the base station can be divided into a plurality of smaller areas, and each smaller area can provide communication service through a base station subsystem (for example, a small indoor base station remote radio head (RRH)). The term "cell" or "sector" refers to part or all of the coverage area of at least one of the base station and the base station subsystem that performs communication service in the coverage.

In the present disclosure, terms such as "MS: Mobile Station," "user terminal," "UE: User device," "terminal," or the like can be used interchangeably.

The mobile station UE is also referred to as a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmission device, a reception device, a communication device, etc. Note that at least one of the base station and the mobile station may be a device mounted on a mobile body, the mobile body itself, or the like. The mobile body may be a vehicle (for example, a car, an airplane), a mobile body that moves unmanned (for example, a drone, or an automatically driven vehicle), or a robot (manned type or unmanned type). Note that at least one of the base station and the mobile station also includes a device which does not necessarily move during the communication operation. For example, at least one of the base station and the mobile station may be an IoT (Internet of Things) device such as a sensor.

Furthermore, the base station in the present disclosure may be replaced with a user terminal. For example, the communication between the base station and the user terminal is replaced with communication (for example, may be referred to as Device-to-Device (D2D), Vehicle-to-Everything (V2X)) between a plurality of user devices 20, and each aspect/embodiment of the present disclosure may be applied to the configuration after replacement. In this case, the user device 20 may have the functions of the network node 10 described above. Furthermore, terms such as "uplink" and "downlink" may also be read as terms corresponding to inter-terminal communication (for example, "side"). For example, uplink channels, downlink channels, or the like may be replaced with side channels.

Similarly, the user terminal in the present disclosure may be replaced with a base station. In this case, the base station may include the functions of the above-described user terminal.

The terms "determine (determining)" and "decide (determining)" used in this disclosure may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided. "Determine (decision)" may be replaced with "assuming," "expected," "considering," or the like.

The terms "connected" and "coupled" or all of the modifications of the terms mean all of direct and indirect connections or couplings between two or more elements and can include a case in which one or more intermediate elements are present between two "connected" or "coupled" elements. The coupling or connection between elements may be physical coupling or connection, logical coupling or connection, or a combination thereof. For example, "connect" may be read as "access." In the disclosure, it can be considered that two elements are "connected" or "coupled" to each other by using one or more electric wires, at least one of a cable and a printed electrical connection and by using electromagnetic energy with a wavelength in a radio frequency domain, a microwave domain, and an optical (both visible and invisible) domain as some non-restrictive and incomprehensive examples.

The reference signal can be abbreviated to RS and may be called a pilot signal according to the standard to be applied.

In the present disclosure, the term "on the basis of" used in the specification does not mean "on the basis of only" unless otherwise stated. In other words, the term "on the basis of" means both "on the basis of only" and "on the basis of at least".

In the present disclosure, any reference to elements with the names "first" and "second" used in the specification does not generally limit the number of elements or the order of the elements. These names can be used as a convenient method for distinguishing two or more elements in the disclosure. Accordingly, a reference to the first and second elements does not mean that only two elements can be used or that the first element needs to precede the second element in some form.

The term "means" in the structure of each of the above-mentioned devices may be substituted with, for example, a "unit", a "circuit", or a "device".

In the present disclosure, when "include," "including," and modifications thereof are used, these terms are intended to be inclusive, similar to the term "comprising". In addition, the term "or" used in the present disclosure does not mean exclusive OR.

In the present disclosure, if an article is added by translation, such as "a," "an," and "the" in English, the present disclosure may include a case where the noun following the article is plural.

In the present disclosure, the term "A and B are different" may mean "A and B are different from each other". Note that this term may mean "A and B are each different from C". Terms such as "separated", "coupled", or the like may also be interpreted in the same manner as "different".

Each aspect/embodiment described in the present disclosure may be used singly or in combination, or may be used by being switched in accordance with the execution. Furthermore, reporting of predetermined information (for example, reporting "being X") is not limited to being reporting explicitly; this may be done implicitly (for example, not reporting the predetermined information).

Note that, the network node 10, the application server 10, the user device 20, or the client application 20 in the present disclosure is an example of a communication device. The transmitting unit 210 and the receiving unit 220 is an example of a communication unit. The transmitting unit 110 and the receiving unit 120 are an example of a communication unit.

Although the present disclosure has been described in detail, it is apparent to those skilled in the art that the present disclosure is not limited to the embodiments as described in the present disclosure. The present disclosure can be implemented as modifications and variations without departing from the gist and scope of the present disclosure as defined in claims. Thus, the description in the present disclosure is intended for exemplary description and does not mean any restriction to the present disclosure.

This international patent application is based on and claims priority to Japanese Patent Application No. 2019-112297 filed on Jun. 17, 2019, and the entire content of Japanese Patent Application No. 2019-112297 is incorporated herein by reference.

LIST OF REFERENCE SYMBOLS

10 network node
110 transmitting unit
120 receiving unit
130 configuration unit
140 control unit
20 user device
210 transmitting unit
220 receiving unit
230 configuration unit
240 control unit
1001 processor
1002 storage device
1003 auxiliary storage device
1004 communication device
1005 input device
1006 output device

The invention claimed is:
1. A communication device comprising:
a processor that obtains information related to Quality of Service (QOS) control and determines to transmit information indicating whether the QoS can be provided based on the information related to the QoS control; and a transceiver that transmits, to another communication device, the information indicating whether the QoS can be provided, wherein the transceiver further executes radio communication to which the QoS control is applied, the QoS control being executed based on the information indicating whether the QoS can be provided, and wherein the processor uses at least one of a destination IP address of a packet or a communication port, as a condition to determine whether the QoS can be provided.

2. The communication device according to claim 1, wherein the QoS is applied to a communication device in which a specific level of communication quality is assumed.

3. A communication method executed by a communication device, the communication method comprising:

obtaining information related to Quality of Service (QOS) control and determining to transmit information indicating whether the QoS can be provided based on the information related to the QoS control;

transmitting, to another communication device, the information indicating whether the QoS can be provided; and executing radio communication to which the QoS control is applied, the QoS control being executed based on the information indicating whether the QoS can be provided, wherein, at least one of a destination IP address of a packet or a communication port is used, as a condition to determine whether the QoS can be provided.

4. The communication device according to claim 1, wherein the QoS is applied to a communication device in which a specific geographical location is assumed due to communication quality.

5. A system comprising:

a communication device including a processor that obtains information related to Quality of Service (QOS) control and determines to transmit information indicating whether the QoS can be provided based on the information related to the QoS control; and a transceiver that transmits, to another communication device, the information indicating whether the QoS can be provided, wherein the transceiver further executes radio communication to which the QoS control is applied, the QoS control being executed based on the information indicating whether the QoS can be provided, and wherein the processor uses at least one of a destination IP address of a packet or a communication port, as a condition to determine whether the QoS can be provided; and another communication device including a receiver that receives the information indicating whether the QoS can be provided; and a controller that applies the QoS control to the communication device based on the information indicating whether the QoS can be provided.

* * * * *